Figure 1:
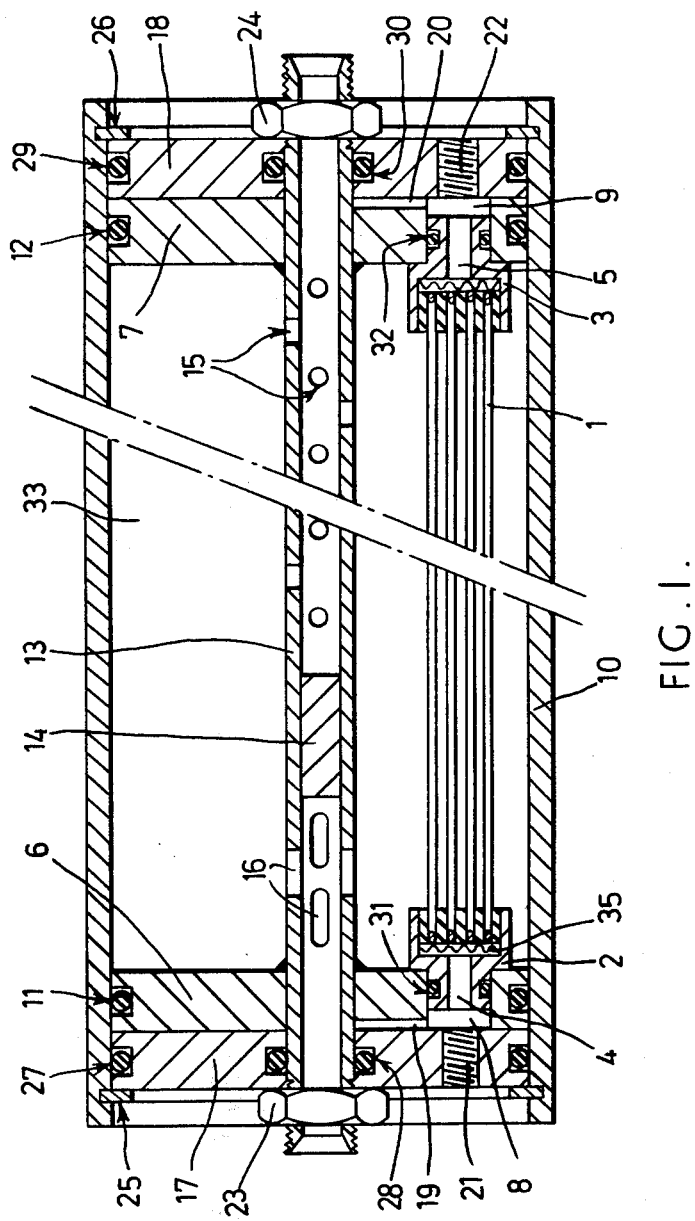

United States Patent [19]
Brun et al.

[11] 3,953,334
[45] Apr. 27, 1976

[54] FLUID FRACTIONATING APPARATUS

[75] Inventors: Robert Brun, Billene; Michel Pages, St.-Martin-d'Ardeche, both of France

[73] Assignee: Rhone-Poulenc, S.A., Paris, France

[22] Filed: June 26, 1974

[21] Appl. No.: 483,361

[30] Foreign Application Priority Data
June 27, 1973 France .................. 73.23481

[52] U.S. Cl. .................. 210/321 R; 210/323 T; 210/433 M; 210/321 A
[51] Int. Cl.² .................. B01D 31/00
[58] Field of Search .......... 55/16, 158; 210/321, 210/323, 433, 491, 500 M, 494

[56] References Cited
UNITED STATES PATENTS

| | | | |
|---|---|---|---|
| 3,246,764 | 4/1966 | McCormack | 210/321 |
| 3,367,505 | 2/1968 | Bray | 210/494 X |
| 3,417,870 | 12/1968 | Bray | 210/494 X |
| 3,442,389 | 5/1969 | Mendelson | 210/491 X |
| 3,498,909 | 3/1970 | Littman | 210/500 M X |
| 3,612,282 | 10/1971 | Cheng | 210/500 M X |
| 3,722,694 | 3/1973 | Agranat | 210/321 |
| 3,774,771 | 11/1973 | Manjikian et al. | 210/321 |
| 3,795,318 | 3/1974 | Crane et al. | 210/321 |
| 3,813,334 | 5/1974 | Bray | 210/494 X |
| 3,819,056 | 6/1974 | Aitken et al. | 210/500 M X |
| 3,820,661 | 6/1974 | Pages | 210/433 X |
| 3,852,198 | 12/1974 | Murakami | 210/494 X |

*Primary Examiner*—Charles N. Hart
*Assistant Examiner*—Robert H. Spitzer
*Attorney, Agent, or Firm*—Stevens, Davis, Miller & Mosher

[57] ABSTRACT

Fluid fractionating apparatus comprising a jacket, two side plates forming with said jacket a closed chamber, at least one aperture formed in each side plate, a cap located at least partly in each aperture, each cap having a cavity communicating with the interior of the chamber and an orifice communicating via its aperture with the exterior of the chamber, a plurality of cylindrical elements extending substantially axially in said chamber and each comprising a textile sheath forming at least one channel, and a membrane covering the textile sheath and being joined thereto at each of its ends in a leakproof manner, the cylindrical elements having an external diameter of between 1 and 10 mm, the two ends of the cylindrical elements each being located in a fluidtight manner in the cavity of one of said caps, and means for feeding a fluid to and from the chamber. The cylindrical elements are grouped in bundles, the ends of the elements of a bundle being located in the cavity of a single cap.

13 Claims, 2 Drawing Figures

FLUID FRACTIONATING APPARATUS

The present invention relates to fluid fractionating apparatus comprising tubular membranes of small diameters.

Such apparatuses can be used either as devices for effecting exchange between two fluids or as devices for separating fluids, it being possible for the fluids to be liquids or gases, in diverse applications such as reverse osmosis, ultrafiltration, gas permeation and dialysis.

According to the present invention, we provide fluid fractionating apparatus comprising a jacket, two side plates forming with said jacket a closed chamber, at least one aperture formed in each side plate, a cap located at least partly in each aperture, each cap having a cavity communicating with the interior of the chamber and an orifice communicating via its aperture with the exterior of the chamber, a plurality of cylindrical elements, extending substantially axially in said chamber and each comprising a textile sheath forming at least one channel, and a membrane covering the textile sheath and being joined thereto at each of its ends in a leakproof manner, the cylindrical elements having an external diameter of between 1 and 10 mm, the two ends of the cylindrical elements each being located in a fluid tight manner in the cavity of one of said caps and means for feeding a fluid to and from the chamber.

Such an apparatus can be very compact, easy to assemble and maintain, and can be used either as a fluid separator or as a fluid exchanger.

Figure 2:
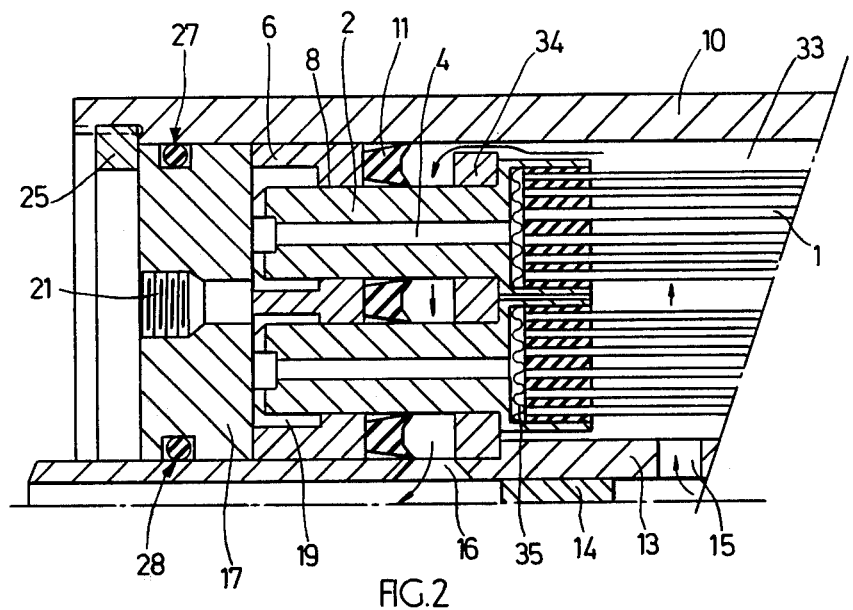

The invention will be understood more readily from the following description, given by way of example only, reference being made to the accompanying drawings, in which:

FIG. 1 is the cross-sectional view along an axial plane of a first embodiment of the apparatus according to the invention; and FIG. 2 is a partial view in axial cross-section of a second embodiment of apparatus according to the invention.

Referring to FIG. 1, the apparatus includes a number of cylindrical elements 1. These elements are substantially parallel and are grouped in bundles which are held tightly against one another at least near their ends and are sealed to one another and to the inside of caps 2 and 3, for example by means of gaskets made of silicone elastomer or of a resin such as an epoxy resin. In order to make the drawing clearer, only one of these bundles has been represented. These cylindrical elements can consist, for example, of cords comprising a hollow textile sheath covered, preferably externally, with a membrane. The membrane can be semipermeable or microporous, that is to say respectively selectively or non-selectively permeable to fluids. The cords are open at both ends, by means of which they communicate with an axial orifice 4 or 5 which passes through the end of each cap, generally through a porous material 35 consisting, for example, of a polyethylene grid supporting the end of the cords. The caps are positioned on two coaxial opposite side-plates 6 and 7, each cap being inserted at least partly in an aperture 8 or 9 provided on the side-plate. The caps can advantageously be detached from the sideplates, leakproofness being then ensured by gaskets 31 and 32.

The side-plates have as many apertures 8 or 9 as there are collections of cords grouped in bundles. The two side-plates 6 and 7 are positioned inside a cylindrical jacket 10 thus forming a closed chamber 33. Gaskets 11 and 12, for example toroidal gaskets, ensure leakproofness to fluids between the side plates 6 and the jacket 10.

The side-plates 6 and 7 are connected by an axial support 13, which is shown in the form of a tube having a stopper 14 between its two ends. This tube has orifices 15 and 16 positioned between the side-plates 6 and 7, and on either side of the stopper 14. The side-plates 6 and 7 can be firmly fixed to the axial support 13 and can be joined, for example, by welding. Flange menbers 17 and 18 are positioned on either side of the side-plates 6 and 7, outside the closed chamber 33 and can be held against the side-plates by tightening nuts 23 and 24. The whole is located inside the jacket 10 for example by means of circlips 25 and 26. Channels 19 and 20 connect the various apertures 8 and 9 provided in the side-plates 6 and 7 to one another and bring them into communication with common manifolds 21 and 22 which pass respectively through the flange members 17 and 18. Leakproofness is ensured by gaskets, for example toroidal gaskets 27, 28, 29, and 30.

Several collections of cords grouped in bundles, which are generally similar to one another can be juxtaposed to one another and can fill the chamber 33 between the jacket 10 and the side-plates 6 and 7 almost completely. Excellent compactness is thus achieved, that is to say a large membrane surface area for an apparatus of a particular volume.

Advantageously, the apparatus is circular in crosssection centered on the axial support and the bundles of cords are distributed in one or more concentric rings.

The apparatus according to the invention can function either as an exchanger or as a separator.

When the apparatus functions as an exchanger, two fluids which may be liquid and/or gaseous pass through it, generally in counter-current. The primary fluid enters the chamber 33, for example via the tube 13 and the orifices 15, flows in this chamber outside the membranes covering the cords, and is then discharged via the orifices 16 and the tube 13. The secondary fluid enters via the common manifold 21 and the channel 19 and orifice 4, flows inside the cords, and is discharged at the opposite end in a substantially symmetrical manner.

When the apparatus functions as a separator, the treated fluid flows in the same way as the primary fluid and the permeate which has passed through the membrane covering the cords is discharged either at one end or preferably at both ends of the cords.

FIG. 2 represents a second embodiment of the apparatus according to the invention. The elements of FIG. 2 which are similar to those of FIG. 1 are denoted by the same numbers. The apparatus is one of circular cross-section and comprises bundles of cords arranged in two concentric rings. The ends of two bundles of cords belonging to each of these rings, are represented in FIG. 2.

This apparatus differs from the apparatus described above essentially by the presence at at least one end of the apparatus, and preferably at each end, of a transverse plate 34 supporting the caps 2. This plate 34 is positioned between the orifices 15 and 16 and divides the cavity 33 into two chambers which communicate with one another only at their periphery. These plates play a double role; firstly, they can make it easier to assemble and join the bundles of cords, before they are introduced into the jacket 10. For this purpose, they can advantageously be connected to one another by peripheral crossbars (not represented); they then form a type of squirrel cage. They also serve as a baffle which forces the primary fluid to pass completely through the zone where the cords are situated and to flow along the jacket 10 before being discharged through the orifices 16.

This apparatus also comprises other fittings, for example the leakproofing device 11 which consists of a flat gasket with a multiplicity of lip-rimmed orifices, and which, under the effect of the pressure, presses simultaneously against the caps 2 against the internal wall of the jacket 10 and against the external wall of the axial tube 13.

This apparatus can also advantageously comprise a baffle (not represented) which extends longitudinally between the two opposite walls 34 which receive the caps and which lies substantially in a spiral from the axial support 13 to the jacket 10 surrounding the chamber containing the bundles of cords. This baffle, which is generally sealed to the edges, forces the fluid entering via the axial tube to sweep transversely, in succession over each of the bundles of cords.

The apparatus of the present invention can have many variants. Thus, the apparatus according to FIG. 1 can comprise side-plates 6 and 7 which can move relative to one another. At least one of these side-plates can, for example, slide on the tube 13, and this can make it easier to assemble the apparatus and possibly to adjust the tension of the cords. One of the side-plates can also revolve about the tube 13 relative to the opposite side-plate, and this makes it possible to arrange the bundles of cords obliquely relative to the axis of the apparatus. The cords, the length of which may possibly vary during use, then undergo deformation uniformly in the same way, which makes it possible to retain uniform flow of the fluid which sweeps over the cords. Of course, the two movements of translating and rotating one side-plate relative to the other can be combined, stops or locking systems making it possible to control these movements.

EXAMPLE

A reverse osmosis apparatus is constructed according to FIG. 1 and comprises 36 parallel bundles, each of 10 cords, of unit length 1.35 m, representing a useful membrane surface area of $S = 8$ m$^2$.

The cords consist of a hollow textile sheath braided from polyethylene yarns, of internal and external diameters 1.1 and 2.4 mm respectively. They are covered with a membrane formed in situ by depositing a collodion based on cellulose acetate, working in accordance with the techniques described in French Pat. Nos. 1,426,548 and 1,506,402.

The open end of the cords is introduced into a gasket made of silicone elastomer inside caps mounted in a leakproof manner on plates which, together with the external cylindrical jacket of the apparatus, form a closed chamber.

A flow of raw water under pressure is set up inside this chamber. The pure water which has passed through the membranes by reverse osmosis is collected at the open ends of the cords.

The following results are obtained, degree of rejection denoting, as a percentage, the ratio of the amount of salt held back by the membrane to the original amount of salt.

With a raw water, the hardness of which corresponds to a hydrotimetric strength of 30 French degrees, at 20°C under 30 bars, the degree of rejection is 92% and the daily output of pure water is 5,760 liters. Water is defined as having 1° of hardness if a liter of this water contains 10 mg of calcium carbonate or a proportion of an other salt capable of precipitating as much soap as 10 mg of calcium carbonate does. One French degree approximates 0.7 British degree.

By way of comparison, an apparatus consisting of the same mechanical elements (jacket, plates and casings), but arranged in accordance with British pat. No. 1,304,641 with 36 tubes covered with a membrane of identical constitution, when placed under identical conditions to the apparatus according to the invention, only yields a daily output of 2,090 liters with the same degree of rejection.

These results clearly show the technical progress, and especially the gain in performance, achieved by the apparatus according to the invention, for the same overall size.

We claim:

1. Fluid fractionating apparatus comprising in combination:
   a. a jacket;
   b. two side plates forming with said jacket a closed chamber;
   c. an axial support pipe extending through said chamber by which said side plates are connected;
   d. at least one aperture formed in each side plate;
   e. a cap located at least partly in each said aperture so as to be detachable by movement towards the other side plate and defining a cavity communicating with the interior of the chamber and an orifice communicating the cavity with the exterior of the chamber, via the aperture in which the cap is at least partly located;
   f. a plurality of flexible cords extending substantially axially in said chamber and each consisting of a textile sheath forming at least one channel, and a membrane covering the textile sheath and being joined thereto at each of its ends in a leakproof manner, the flexible cords having an external diameter between 1 and 10 mm, the flexible cords being grouped against one another at least at their ends to form at least one bundle of substantially parallel flexible cords, one end of all the flexible cords of a bundle being located in a fluidtight manner in the cavity of one cap, while the other end of all the flexible cords of a bundle are located in a fluidtight manner in the cavity of another cap;
   g. a stopper provided between the ends of the pipe, and blocking the flow of fluid directly through the pipe; and
   h. a plurality of orifices in said pipe on each side of said stopper spaced along said pipe for feeding fluid to and from the chamber.

2. Apparatus as claimed in claim 1, wherein the textile sheath of each said cylindrical element is hollow.

3. Apparatus as claimed in claim 1, wherein the membrane covers the textile sheath of the external surface of each said cylindrical element.

4. Apparatus as claimed in claim 1, wherein the caps are detachable from the side plates.

5. Apparatus as claimed in claim 1, wherein each side plate has a plurality of apertures and caps, and further comprising a common manifold and channels externally of each side plate, relative to the chamber, connecting the orifices of the caps to the common manifold.

6. Apparatus as claimed in claim 5, and further comprising a flange member which is on the outside of the side plate relative to the chamber, the manifold being formed in said flange.

7. Apparatus as claimed in claim 1, wherein the side plates are firmly fixed to one another.

8. Apparatus as claimed in claim 1, wherein one side plate can move relative to the other, by effecting a translational movement.

9. Apparatus as claimed in claim 1, wherein one side plate can move relative to the other, by effecting a rotational movement.

10. Apparatus as claimed in claim 1, and further comprising at least one transverse plate which receives the caps associated with one side plate and forms a baffle inside the said chamber.

11. Apparatus as claimed in claim 10, and further comprising a flat gasket formed with a multiplicity of orifices, each having a peripheral lip, said gasket pressing against the internal face of a side plate to ensure lateral leakproofness of the said chamber.

12. Apparatus as claimed in claim 10, which comprises two symmetrical transverse plates connected by an axially extending support.

13. Apparatus as claimed in claim 12, and further comprising a baffle which extends longitudinally between the two transverse walls, the baffle lying substantially in a spiral from the axial support to the jacket enclosing the said chamber.

* * * * *